Patented Jan. 15, 1935

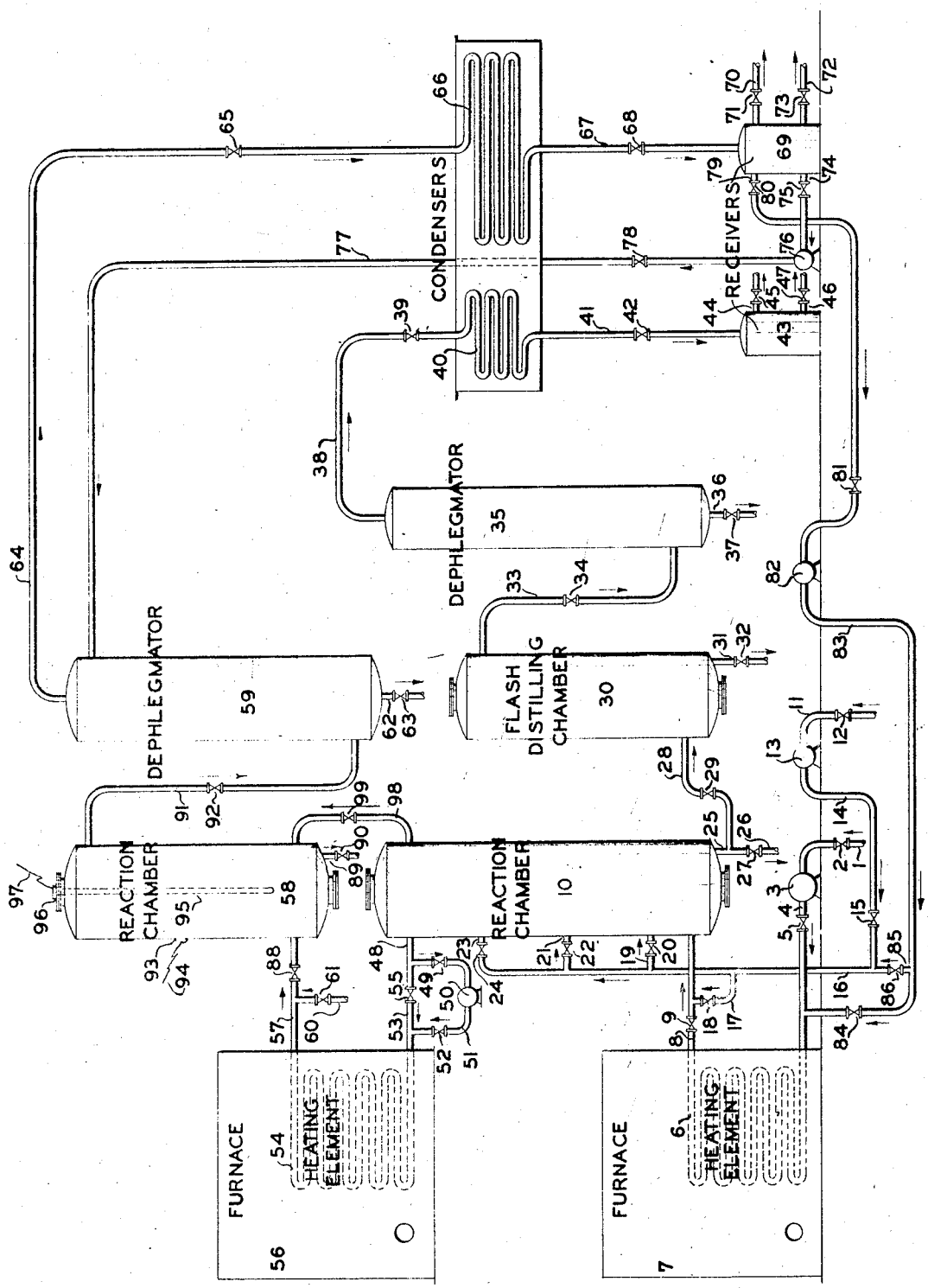

1,988,112

UNITED STATES PATENT OFFICE 1,988,112

POLYMERIZATION OF HYDROCARBON GASES

Gustav Egloff, Chicago, Ill., assignor to Universal Oil Products Company, Chicago, Ill., a corporation of South Dakota Application May 29, 1930, Serial No. 457,434

6 Claims. (Cl. 196—10)

This invention relates to the conversion and polymerization of hydrocarbon gases, and relates more particularly to the polymerization of unsaturated hydrocarbons contained in or produced from hydrocarbon gases, carrying out the reaction in the presence of suitable polymerizing agents at elevated temperature.

It is among the objects of my invention to utilize gases having a high hydrocarbon content which are now used largely for combustion purposes for the manufacture of low boiling liquid hydrocarbons valuable as motor fuel, antiknock compounds, or as raw materials for chemical manufacture. Among the gases which I use are natural gas, refinery gases including uncondensible gases from cracking operations, gases obtained in the destructive distillation of coal, shale or other bituminous materials, and other hydrocarbon gases.

Cracked gases from relatively low temperature cracking processes, i. e., the so-called liquid and liquid-vapor phase processes, usually contain 10 per cent or more by volume of unsaturated hydrocarbons, and in the gases derived from the relatively high temperature processes, i. e., the so-called vapor phase cracking plants, the unsaturated hydrocarbon content may be as high as 50 per cent or more. The unsaturated hydrocarbons are principally of the ethylene series, i. e., ethylene, propylene, butylene, and higher members of the series in relatively small quantities. The remainder of the gas consists principally of saturated hydrocarbon gases, i. e., methane, ethane and small percentages of higher members of the series together with hydrogen, and small amounts of other gaseous constituents. These gases are particularly suitable as raw charging material for processing according to my invention and require little or no pre-treatment.

Natural gas, together with refinery gases and petroleum well gases separated from petroleum containing little or no unsaturated hydrocarbons, and other similar hydrocarbon gases are processed in the practice of my invention at high temperature under suitable time and pressure conditions so as to produce therefrom a maximum yield of unsaturated hydrocarbons. This temperature may vary from 1000° to 1600° F., more or less, depending upon the character of the gas processed. The rate and character of the reaction may be further regulated by the utilization of suitable cooling agencies, i. e., uncondensible gases from the process may be used for this purpose, or hydrocarbon oil may be introduced as will be later described.

The polymerization stage is carried out in the presence of a polymerizing agency at elevated temperature. The temperature used, although it may be as high or higher than that used in the production of unsaturated hydrocarbons, is usually carried out at lower temperatures. I may use catalysts to promote the polymerization, i. e., metals, such as aluminum, chromium, zinc, iron, nickel, cobalt, calcium, barium, strontium, molybdenum, tungsten, titanium, or their oxides, and other compounds or mixtures thereof, also the noble metals and their compounds may be used, as for example, platinum, palladium and osmium. These catalysts are used preferably in a finely divided form or suitably dispersed on a distributing agency so as to offer large catalytic reaction surface. The polymerization may be brought about or accentuated by absorbent earths, such as, i. e., fuller's earth and various natural clays or mixtures thereof with alkalis or alkaline earth oxides, or with the catalysts above enumerated, these polymerizing agencies being so distributed and arranged as to permit proper contacting at the desired reaction temperature. The desired reactions may be brought about by the polymerizing action of the electrical discharge under suitable conditions of temperature, pressure and electrical current.

Regulated amounts of hydrogen may be added to the process in some cases, as for example, during the polymerization stage so that the synthetic product will not be of a highly unsaturated character such as, for example, a diolefinic, or related hydrocarbon nature, but rather of an aromatic, olefinic or paraffinic character. Pure hydrogen, or hydrogen containing gases may be used. Examples of the hydrogen containing gases which may be used are water gas, coal gas or other hydrogen containing gases or mixtures thereof.

The invention is carried out in equipment comprising heating means, which may or may not be an integral part of the conversion zone for producing unsaturated hydrocarbons. The polymerization stage comprises a heating zone, a conversion zone, integral with or apart from the heating zone, means for fractionating and separating the reaction products, together with condensing, cooling and collecting means.

The pressure used in various elements of the process may be uniform or equalized, varying only as a result of the frictional drop in the passage of the gases or products therethrough, or differential pressures may be used between the various elements comprising the system. The pressure may vary from high super-atmospheric pressure, for example, 1000 pounds per square inch to atmospheric or sub-atmospheric pressure. The temperatures used during the polymerization treatment may be as high as 900° F., or more.

The accompanying drawing, which represents a diagrammatic side elevation of suitable apparatus for the performance of the process, embodies one of the many forms of processing which are contemplated in my invention.

Referring to the drawing, hydrocarbon gas of the character stated is directed to the process through line 1 and valve 2 to the pump 3 which feeds the gas through line 4 and valve 5 to the heating element 6 located in furnace 7. The heated products leave the heating element 6 through line 8, regulated by valve 9, passing into the reaction chamber or cooling zone 10, this zone being used in some cases primarily for conversion purposes and in other cases, particularly when high temperatures are used in the heating element, for cooling purposes. Hydrocarbon oil may be introduced to the process through line 11 and valve 12 leading to pump 13 which forces the same through line 14 and valve 15 into line 16, from which this oil may be directed through line 17, regulated by valve 18, into the transfer line 8, or to various levels in zone 10 for cooling purposes, as for example, through line 19, controlled by valve 20, line 21, controlled by valve 22, and/or line 23, controlled by valve 24. Unvaporized oil from zone 10 is withdrawn through line 25 and may be removed from the system through line 26, regulated by valve 27, or it may be passed through line 28, regulated by valve 29, into the low pressure flash distilling chamber 30. Unvaporized oil is removed from chamber 30 through line 31, regulated by valve 32, and the vapors leave chamber 30 through line 33, regulated by valve 34, and pass to the dephlegmator 35. Condensate is removed from dephlegmator 35 through line 36, regulated by valve 37, and vapors leave through line 38, passing through valve 39 to condenser 40, the cooled products passing through line 41 and valve 42 to receiver 43. Gaseous products are removed from receiver 43 through line 44, controlled by valve 45, and liquid products leave through line 46, regulated by valve 47.

The vapor product from zone 10 may exit through line 48 and may flow through valve 49 to pump 50 which pumps the product through line 51 and valve 52 into line 53 leading to heating element 54, or the product may flow under its own pressure through line 48 into line 53, regulated by valve 55, into the heating element 54. Heating element 54 is located in furnace 56 and the heated products discharge therefrom through line 57 and valve 88, passing into reaction chamber 58 where polymerizing agents may be suitably disposed. Hydrogen or hydrogen-containing gas may be added to the heated product, as for example, through line 60, regulated by valve 61. The vapor product from zone 10 may pass directly to zone 58 through line 98, regulated by valve 99. An electrode 95 may be suitably disposed in chamber 58, being connected at its terminal 96 to electrical lead wire 97, the reaction chamber forming the other electrode, and is connected at terminal 93 to electrical lead wire 94. Polymerized or unvaporized residue is withdrawn through line 89, regulated by valve 90. Vapors and gases leave reaction chamber 58 through line 91, regulated by valve 92, passing into dephlegmator 59. Condensed products leave dephlegmator 59 through line 62, regulated by valve 63, and vapors and gases from the dephlegmator pass through line 64 and valve 65, passing to the condenser 66 and thence through line 67 and valve 68 to receiver 69. Gaseous products are removed from receiver 69 through line 70, regulated by valve 71, and liquid products are removed through line 72, regulated by valve 73. Any desired portion of the liquid in receiver 69 may be directed through line 74, regulated by valve 75, to pump 76 and thence through line 77, regulated by valve 78, into the top of dephlegmator 59, primarily to serve as a cooling medium therein. Uncondensible gas may be removed from receiver 69 through line 79, regulated by valve 80, and directed through valve 81 to the pump or compressor 82 which pumps the gas through line 83, either for retreatment through valve 84 into line 4 leading to heating element 6, or into line 85, regulated by valve 86, into line 16 from which it may be directed into line 8 or zone 10 for cooling or retreatment purposes.

Several examples illustrating a few of the many applications of my invention are given below.

A natural gas which contains approximately 75 per cent methane, approximately 10 per cent ethane, approximately 7 per cent propane, and some higher hydrocarbons of this series, is directed to heating element 6 and heated to a temperature of approximately 1400° F., at a pressure of approximately 85 pounds per square inch. A 30–32° A. P. I. gravity gas oil is introduced into zone 10 in sufficient volume to cool the reaction products to approximately 800° F., the unvaporized oil being withdrawn through line 25 and directed into flash distilling chamber 30 where it is flash distilled at substantially atmospheric pressure. The unsaturated hydrocarbon product produced in zone 10 is forced by pump 50 into heating element 54, where a temperature of approximately 850° F. is maintained and then discharged into reaction chamber 58 containing a bed of nickel catalyst distributed on broken tile. Hydrogen amounting to approximately 3–5 per cent by weight of the liquid product removed from receiver 69 is introduced through line 60 into the reaction products leaving heating element 54.

The liquid product removed from receiver 69 is a high anti-knock motor fuel having an anti-knock equivalent approximately equal to that of benzol and corresponds to a yield of approximately 4–5 gallons per 1000 cubic feet of gas processed. A higher boiling synthetic product amounting to approximately 1–2 gallons per 1000 cubic feet of gas processed is removed from the bottom of dephlegmator 59 through line 62.

As an example of the application of my process where utilizing a hydrocarbon gas containing higher percentages of unsaturated hydrocarbons, a cracked gas from a vapor-phase process containing approximately 35 per cent by volume of unsaturated hydrocarbons is directed to pump 50 directly by means not shown without undergoing treatment in heating element 6 and zone 10 and is processed substantially as described above, or instead of being treated with this catalyst may be heated to approximately 950° F., at a pressure of approximately 200 pounds per square inch and be passed into a bed of granular fuller's earth disposed in the lower part of reaction chamber 58. A non-vaporized residue is removed from chamber 58 through line 89, and condensed products are removed from dephlegmator 59 through line 62 which amount to approximately 3–3½ gallons per 1000 cubic feet of gas processed, and a hydrocarbon product boiling below 350° F., having an anti-knock value somewhat higher than benzol, is removed from receiver 69, the yield of this product being approximately 3 gallons per 1000 cubic feet of gas processed.

In an example illustrating the practice of my invention when utilizing the polymerizing effect of the electrical discharge for the purpose of producing high anti-knock motor fuel hydrocarbons, a petroleum gas containing approximately no unsaturated hydrocarbons and having a content of approximately 82 per cent methane, approximately 7 per cent ethane, some higher members of the paraffin series, the balance consisting of hydrogen and residual gas, is fed to heating element 6 and heated therein to approximately 1600° F., under a pressure of approximately 50 pounds per square inch and directed to zone 10 where a 26–28° A. P. I. gravity reduced crude oil is introduced in sufficient quantity to cool the gases to approximately 600° F., at which temperature they pass at substantially atmospheric pressure directly into the reaction chamber 58 through which a high frequency electrical discharge is passed, activating the gases and polymerizing unsaturated hydrocarbons contained therein while a temperature of approximately 550° F. is being maintained.

The distillate removed from receiver 69 in this operation amounted to 1–2 gallons per 1000 cubic feet of gas processed, and the heavier hydrocarbon product removed from dephlegmator 59 through line 62 amounted to approximately 4 gallons per 1000 cubic feet of gas processed.

I claim as my invention:

1. A process for treating gases containing saturated hydrocarbons which comprises heating the gases sufficiently to convert a substantial portion of the saturated hydrocarbons into unsaturates, then cooling the unsaturated gases by contact with hydrocarbon liquid thereby vaporizing part of the liquid, subjecting the resultant mixture of vapors and unsaturated gases to a polymerizing treatment in the presence of a polymerizing agent at lower temperature than that to which the gases were initially heated, and condensing the polymerized products.

2. The process as defined in claim 1 further characterized in that hydrogen is added to said mixture during the polymerization treatment.

3. A process for treating gases containing saturated hydrocarbons which comprises, heating the gases sufficiently to convert a substantial portion of the saturated hydrocarbons into unsaturates, then cooling the unsaturated gases by contact with additional gases containing unsaturated hydrocarbons and hydrocarbon liquid thereby vaporizing part of the liquid, subjecting the resultant mixture of vapors and unsaturated gases to a polymerizing treatment in the presence of a polymerizing agent, and condensing the polymerized products.

4. A process for treating gases containing saturated hydrocarbons which comprises, heating the gases sufficiently to convert a substantial portion of the saturated hydrocarbons into unsaturates, then cooling the unsaturated gases by direct contact with incondensible gases from the system and hydrocarbon liquid thereby vaporizing part of the liquid, subjecting the resultant mixture of vapors and unsaturated gases to a polymerizing treatment in the presence of a polymerizing agent and condensing the polymerized products.

5. A process for treating gases containing saturated hydrocarbons which comprises heating the gases sufficiently to convert a substantial portion of the saturated hydrocarbons into unsaturates, then contacting the heated unsaturated gases with a relatively cool hydrocarbon liquid thereby cooling the gases and vaporizing part of the liquid, subjecting the resultant mixture of vapor and unsaturated gases to a polymerization treatment and polymerizing a substantial portion thereof at a lower temperature than that to which the gases were initially heated, and condensing the polymerized products.

6. A process for treating gases containing saturated hydrocarbons which comprises heating the gases sufficiently to convert a substantial portion of the saturated hydrocarbons into unsaturates, then contacting the heated unsaturated gases with a relatively cool hydrocarbon liquid thereby cooling the gases and vaporizing part of the liquid, subjecting the resultant mixture of vapor and unsaturated gases to a polymerization treatment and polymerizing a substantial portion thereof at a lower temperature than that to which the gases were initially heated, condensing the polymerized products, and returning incondensible gases to the process.

GUSTAV EGLOFF.